Nov. 19, 1940.    W. D. MOUNCE ET AL    2,222,182
EARTH IMPEDANCE MEASURING DEVICE
Filed Aug. 21, 1937    3 Sheets-Sheet 1

Whitman D. Mounce
William M. Rust Jr.
INVENTOR.

BY P. L. Young
ATTORNEY.

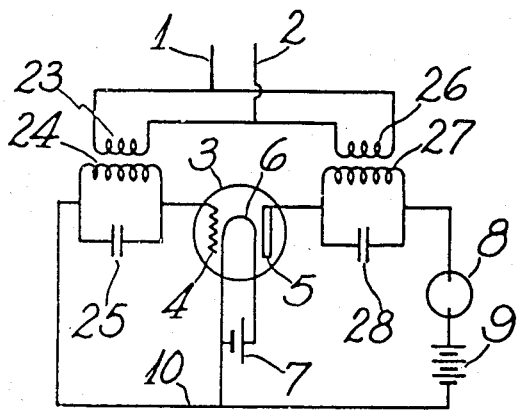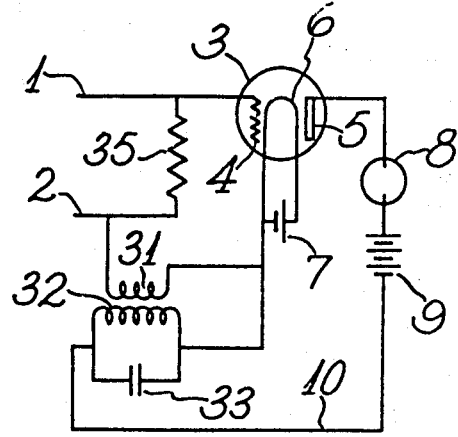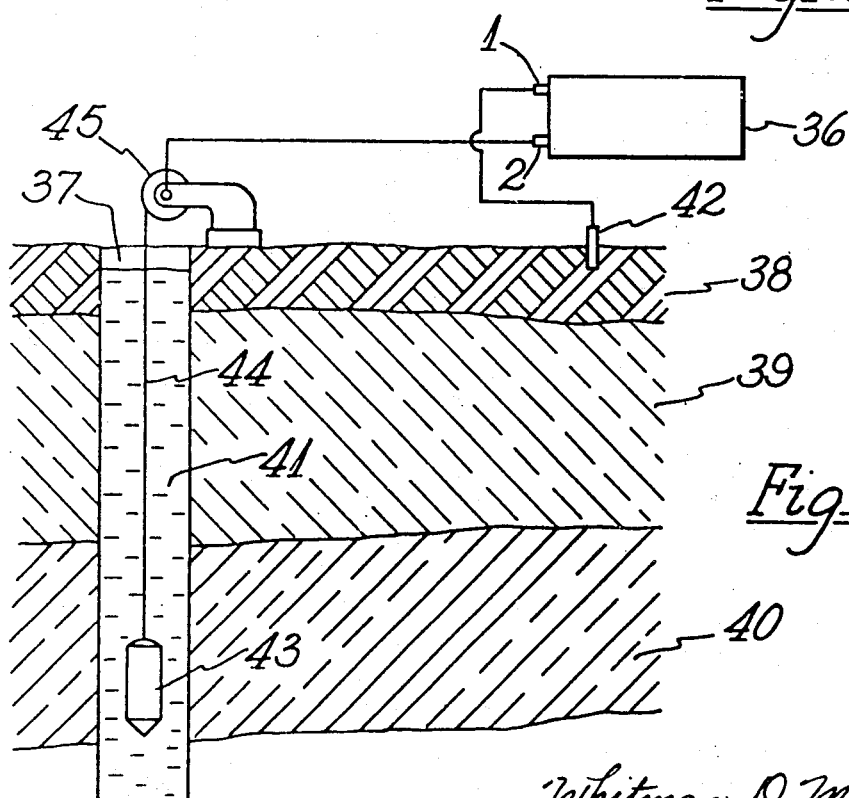

Patented Nov. 19, 1940

2,222,182

UNITED STATES PATENT OFFICE 2,222,182

EARTH IMPEDANCE MEASURING DEVICE

Whitman D. Mounce and William M. Rust, Jr., Houston, Tex., assignors to Standard Oil Development Company, a corporation of Delaware Application August 21, 1937, Serial No. 160,213

7 Claims. (Cl. 175—182)

The object of this invention is to provide a simpler and more efficient method and apparatus for measuring small changes in the electrical impedance of the earth.

In the method covered by Patent No. 2,037,306 the change in impedance is caused to change the frequency of an oscillator. The frequency of this oscillator is measured. In order to record continuously and automatically, the resulting frequencies, either an electronic frequency meter or a conventional recording frequency meter is required. The electronic frequency meter involves a somewhat complex circuit and numerous vacuum tubes, while the conventional meter requires a power amplifier. In either, the changes of frequency normally encountered in well-logging and other applications are very small and additional amplification is necessary.

This invention simplifies the process by combining, in effect, the oscillator and frequency meter in a single circuit requiring a single vacuum tube. This invention takes advantage of the fact that the direct current component of the plate current of a vacuum tube oscillator is a function of all parameters of the circuit. This invention is thus of wider application than above suggested. In some modifications the frequency can remain essentially constant.

This invention will be readily understood from the description below and the figures in which, Fig. 1 is a diagrammatic representation of a preferred embodiment of the invention, in which a tuned-plate-tuned-grid oscillator is used, whereby variations in the impedance to be measured vary the resonant frequency of the tuned-grid circuit, the resonant frequency of the tuned-plate circuit being unchanged.

Fig. 4 is a diagrammatic representation of a preferred embodiment of the invention, in which the impedance to be measured is inserted in shunt in the coupling circuit, whereby changes in the impedance produces changes in the coupling between the tuned-plate and tuned-grid circuits.

Fig. 5 is a diagrammatic representation of a preferred embodiment of the invention, employing a tuned-plat-untuned-grid oscillator in which the impedance is inserted in series with the grid.

Fig. 6 is a diagrammatic representation which shows an application of this invention to well-logging, with the apparatus at the surface.

Figure 1:
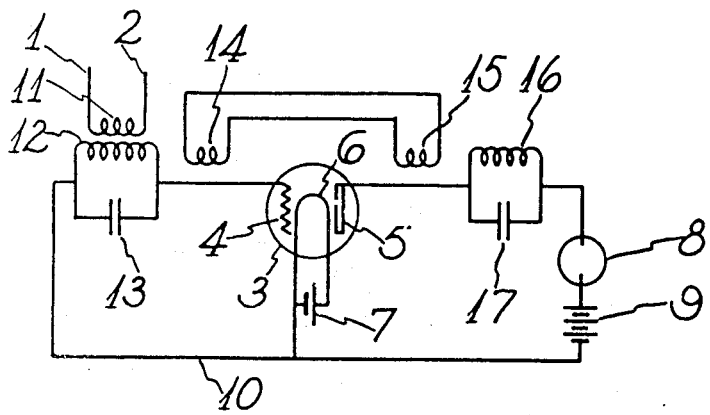

In Fig. 1 the numerals 1 and 2 represent the terminals which are connected to the impedance to be measured. Numeral 3 represents a vacuum tube. Numeral 4 represents the grid of vacuum tube 3. Numeral 5 is the plate. Numeral 6 is the filament which is heated by battery 7. Numeral 8 is a recording device which may include an amplifier which is not responsive to the frequencies of the oscillator. Numeral 9 is the plate battery. The terminals 1 and 2 are connected to the primary 11 of a transformer. The secondary 12 of this transformer and the condenser 13 connected in parallel form the tuned-grid circuit of an oscillator. This circuit is connected to grid 4 and to the common conductor 10. The coil 16 and the condenser 17 are in parallel, and form the tuned-plate circuit of the oscillator and are connected to the plate 5 and the recorder 8 and the plate battery 9 which are in series. The condenser 17, and any other condensers shown, may consist, entirely or in part, of the distributed capacity of the associated inductance. The plate battery 9 is connected to the common conductor 10. The filament 6 is connected to the common conductor 10. Coil 14 which is inductively coupled to coil 12 is in series with coil 15 which is inductively coupled to coil 16. A change of impedance between 1 and 2 changes the apparent inductance of the coil 12 thus changing the resonant frequency of grid circuit. As is well known, the direct current component of the plate current as shown by recorder 8 is a function of the difference between the resonant frequencies of the plate and grid circuits. Thus the current shown by recorder 8 is a function of the impedance connected between terminals 1 and 2. By a proper choice of the constants of the circuits large variations in the plate current can be produced by small changes of the impedance.

Figure 2:
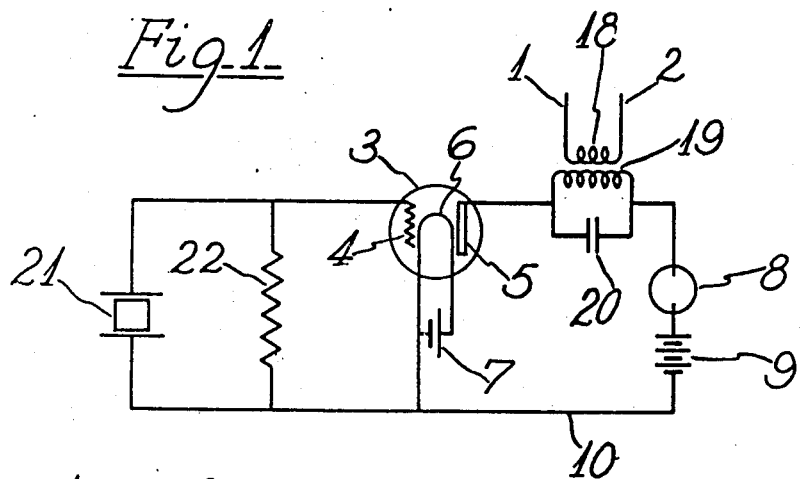
Fig. 2 is a diagrammatic representation of a preferred embodiment of the invention, in which the tuned-grid circuit of Fig. 1 is replaced by a crystal and the impedance varies the resonant frequency of the tuned-plate circuit.

In Fig. 2 numerals 1 through 10 represent the same elements as in Fig. 1. The terminals 1 and 2 are connected to the coil 18 which is the primary of a transformer. The secondary 19 of this transformer and the condenser 20 connected in parallel form the plate circuit of an oscillator. In the grid circuit of the oscillator is connected a crystal 21 shunted by a resistance 22. As discussed in connection with Fig. 1 the changing impedance varies the resonant frequency of the tuned circuit. Small variations in the resonant frequency of the tuned circuit from the frequency of the crystal produce large changes in the direct current component of the plate current.

Figure 3:
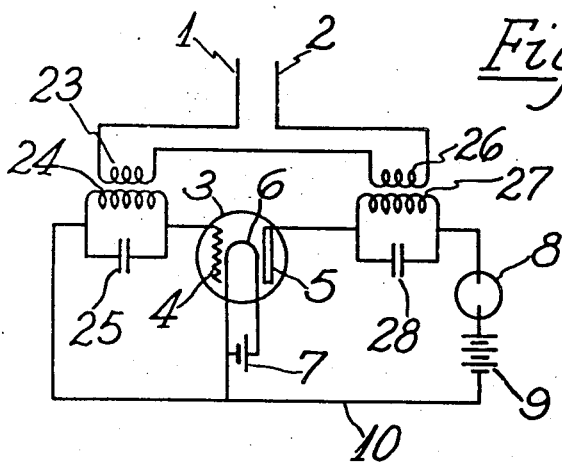
Fig. 3 is a diagrammatic representation of a preferred embodiment of the invention, in which the impedance to be measured is inserted in series in the coupling circuit, whereby changes in the impedance produce changes in the coupling between the tuned-plate and tuned-grid circuits.

In Fig. 3 the numerals 1 through 10 have the same significance as in Fig. 1. The grid circuit of the oscillator consists of coil 24 and condenser 25 in parallel. The plate circuit consists of coil 27 and condenser 28 connected in parallel. The coil 23 which is coupled inductively with the coil 24 is connected in series with the coil 26 which is inductively coupled to the coil 27 and in series with the impedance connected between terminals 1 and 2. Variations in the impedance between 1 and 2 vary the coupling between the grid circuit and the plate circuit thus, as is well known, varying the direct current component of the plate current.

In Fig. 4 all numerals have the same significance as in Fig. 3. Fig. 4 differs from Fig. 3 only in that the impedance to be measured is connected in shunt with the coils 23 and 26. Variations in the impedance again vary the coupling and thus the direct current component of the plate current.

In Fig. 5 the numerals 1 through 10 have the same significance as in Fig. 1. In this figure there is shown a tuned-plate circuit consisting of coil 32 and condenser 33 in parallel and untuned grid circuit consisting of coil 31 which is inductively coupled to coil 32 and which is in series with the impedance connected across terminals 1 and 2. If the direct current impedance of the impedance to be measured is very high, the impedance may be shunted by a resistance 35 which at the frequency of the oscillator is high compared to the impedance. The impedance connected between 1 and 2 varies the loss in the grid circuit of the oscillator and so the amplitude of the oscillations and thus the direct current component of the plate current.

The number of oscillating circuits is unlimited and an impedance in any portion of the oscillator circuit will cause the direct current component of the plate current to change. The oscillators need not be limited to single tube oscillators. The variations shown here are typical ones and those that experiment has shown to be satisfactory.

In Fig. 6 the numeral 36 represents the oscillating circuits and the recorder described in the above figures. The numeral 37 represents a bore hole traversing the earth's strata 38, 39 and 40. The numeral 41 represents water or drilling fluid contained within the hole 37. The numeral 45 represents a reel equipped with slip-rings. The numeral 43 represents an electrode suspended by means of the insulated conductor 44 within the bore hole 37. The conductor 44 connects the electrode 43 to the terminal 2 of 36. The terminal 1 is connected to an earthed electrode 42.

Figure 7:
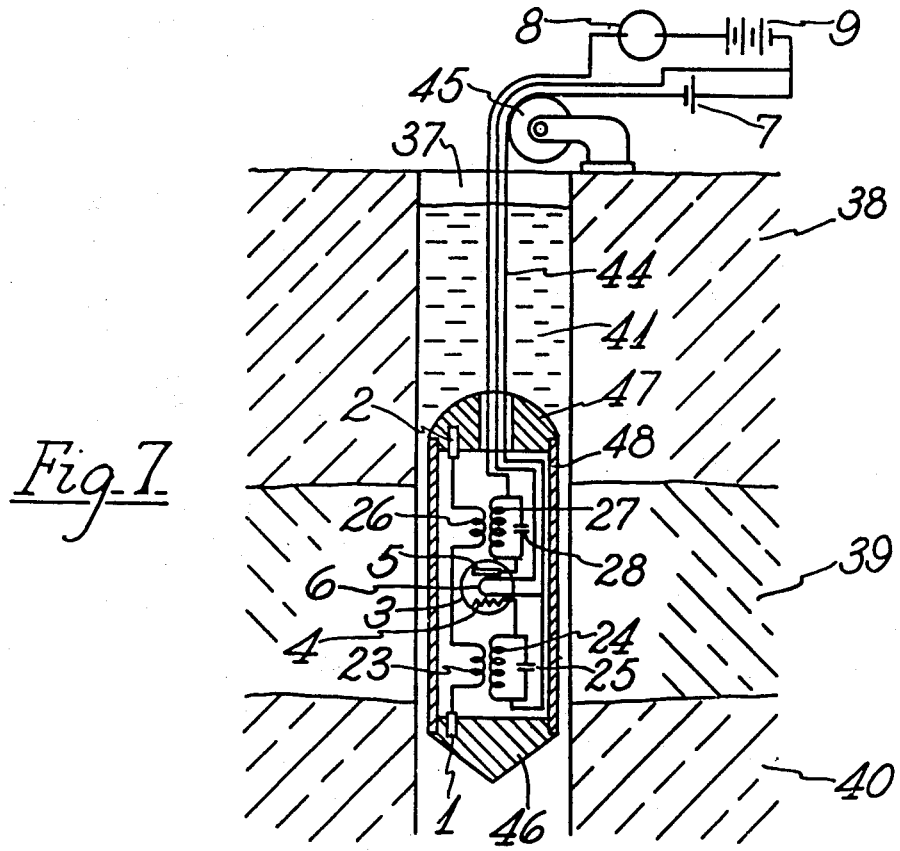
Fig. 7 is a diagrammatic representation which shows an application of this invention to well-logging with the apparatus suspended in the bore hole.

In Fig. 7 the numerals 37 through 41 have the same significance as in Fig. 6. The numeral 48 represents a pressure tight case which is terminated at the lower end by an electrode 46 which is insulated from the case 48. The upper end of case 48 is terminated by an electrode 47 which is insulated from case 48. Within the case 48 is contained all of the apparatus shown by Fig. 3 except the battery 7, the recorder 8 and the battery 9. By means of the insulated three-conductor cable 49 the battery 7, the recorder 8 and the battery 9 are connected in their proper places in the oscillator. The numerals referring to the oscillator have the same significance as in Fig. 3. The terminal 1 is connected to the electrode 46. The terminal 2 is connected to the electrode 47. By obvious changes, any of the circuits of Figs. 1 through 5 may be employed instead of the circuit of Fig. 3.

Figure 8:
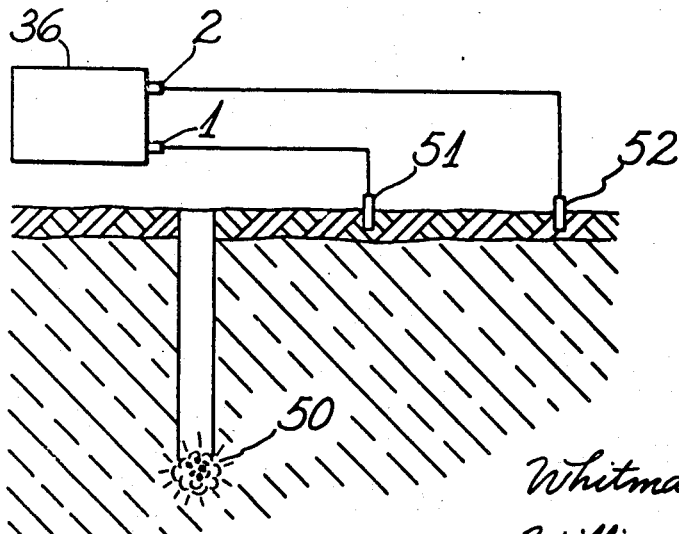
Fig. 8 is a diagrammatic representation of an application of this invention to the seismic-electric method.

In Fig. 8 the numeral 36 represents the apparatus described in any of the Figures 1 through 5. The terminal 1 is connected to an earthed electrode 51. The terminal 2 is connected to an earthed electrode 52. The numeral 50 represents a source of seismic disturbances. The seismic disturbances produce motions of the earth around the electrodes 51 and 52 and thus, as disclosed in patent application No. 759,348, now Patent No. 2,054,067 of September 15, 1936, changing the impedance between terminals 1 and 2. This invention offers a simple method of recording the small changes in impedance.

We claim:

1. Apparatus for measuring small changes in impedance comprising a vacuum tube oscillator, a coupling circuit between the grid and plate circuits, means for introducing the impedance to be measured in series in the coupling circuit whereby the coupling is varied by changes in the impedance, thus varying the direct current component of the oscillator plate current and means for measuring the direct current component of the plate current.

2. Apparatus for measuring small changes in impedance comprising a vacuum tube oscillator, a coupling circuit between the grid and plate circuits, means for introducing the impedance to be measured in shunt in the coupling circuit whereby the coupling is varied by changes in the impedance, thus varying the direct current component of the oscillator plate current and means for measuring the direct current component of the plate current.

3. An apparatus for measuring small changes in impedance comprising a vacuum tube having a plate and a grid, an oscillating circuit in the plate circuit, an oscillating circuit in the grid circuit, means for inductively connecting the changing impedance to be observed to at least one of said oscillating circuits in such a manner that changes in said impedance change the relative resonant frequencies of the plate and grid circuits to thereby effect a change in the coupling between the plate and the grid and a change in the direct current component of the plate current, and means for measuring said direct current component.

4. An apparatus for measuring small changes in impedance comprising a vacuum tube having a plate and a grid, an oscillating circuit in the plate circuit, an oscillating circuit in the grid circuit, an inductive coupling between said oscillating circuits, means for connecting the changing impedance to be observed in series with said inductive coupling whereby changes in said impedance effect a change in the relative resonant frequencies of the grid and late circuits thereby effecting a change in the coupling between said grid and said plate and a change in the direct current component of the plate current, and means for measuring said direct current component.

5. An electrode for measuring changes in impedance along the walls of a borehole comprising a closed chamber, a pair of spaced, exposed metallic surfaces on said chamber, a pair of induction coils arranged in said chamber and connected in series with said exposed surfaces, a vacuum tube having a plate and a grid arranged in said chamber, an oscillating circuit in said chamber connected to said plate and arranged in coupling relation with one of said induction coils, a second oscillating circuit arranged in said chamber, and connected to said grid and arranged in coupling relation with the other of said induction coils, a cable for lowering said chamber in a borehole, a pair of conductors in said cable connected in said chamber to said oscillating circuits and an ammeter connected to said conductors and adapted to be disposed at the surface adjacent the borehole.

6. Apparatus for measuring small changes in impedance comprising a vacuum tube oscillator, a coupling circuit between the grid and plate circuits, means for introducing the impedance to be measured into the coupling circuit, whereby the coupling is varied by changes in the impedance, thus varying the direct current component of the oscillator plate current and means for measuring the direct current component of the plate current.

7. An apparatus for measuring small changes in impedance comprising a vacuum tube having a plate and a grid, an oscillating circuit in the grid circuit and an oscillating circuit in the plate circuit, an inductive coupling between said oscillating circuits, means for inductively connecting the changing impedance to be observed with said inductive coupling, whereby changes in said impedance effect the change in the relative resonant frequencies of the grid and plate circuits, thereby effecting a change in the coupling between said grid and said plate and a change in the direct current component and the plate circuit, and means for measuring the direct component.

WHITMAN D. MOUNCE.
WILLIAM M. RUST, Jr.

DISCLAIMER 2,222,182.—*Whitman D. Mounce* and *William M. Rust, Jr.*, Houston, Tex. EARTH IMPEDANCE MEASURING DEVICE. Patent dated November 19, 1940. Disclaimer filed July 26, 1941, by the assignee, *Standard Oil Development Company*.

Hereby enters this disclaimer to claim 3 of said patent.

[*Official Gazette August 19, 1941.*]

DISCLAIMER 2,222,182.—*Whitman D. Mounce* and *William M. Rust, Jr.*, Houston, Tex. EARTH IMPEDANCE MEASURING DEVICE. Patent dated November 19, 1940. Disclaimer filed July 26, 1941, by the assignee, *Standard Oil Development Company*.

Hereby enters this disclaimer to claim 3 of said patent.

[*Official Gazette August 19, 1941.*]